UNITED STATES PATENT OFFICE 2,455,420

CYANINE DYESTUFF

John David Kendall, Harold Gordon Suggate, and Henry Walter Wood, Ilford, England, assignors to Ilford Limited, Ilford, England, a British company No Drawing. Application January 8, 1942, Serial No. 426,098. In Great Britain January 17, 1941

12 Claims. (Cl. 260—240)

This invention relates to the production and use of dyestuffs useful for sensitising photographic silver halide emulsions.

In our co-pending application Serial No. 426,097 filed on even date herewith, now patent No. 2,368,222, dated January 30, 1945, there is described the production of compounds of the general Formula I

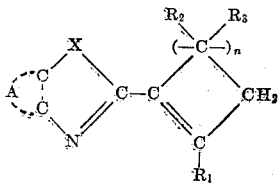

(I)

where X is an oxygen atom, a sulphur atom or a selenium atom, A is the residue of a substituted or unsubstituted mono- or poly-carbocyclic nucleus, $R_1$, $R_2$ and $R_3$ are hydrogen atoms or hydrocarbon groups and $n$ is a positive integer greater than 1.

According to the present invention sensitising dyestuffs for photographic silver halide emulsions are prepared by condensing an alkyl or aralkyl quaternary salt of a compound of general Formula I with an alkyl or aralkyl quaternary salt of a heterocyclic nitrogen compound containing, in the α or γ position to a heterocyclic nitrogen atom, a thioether or selenoether grouping (including an aryl-, alkyl- or aralkyl-thioether group or a corresponding seleno-ether group), or a —(CH=CH)$_x$NH$_2$ group where $x$ is 1, 2 or 3 (including N-acyl, N-aryl and N-acyl-aryl substituted groups of this type).

The grouping —(CH=CH)$_x$NH$_2$ is hereinafter referred to as the aminovinyl type of group.

The condensation is dependent on the reactivity of the CH$_2$ group shewn at the right-hand end of general Formula I and the products conform to the general Formula II.

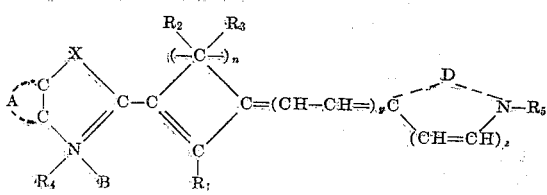

(II)

where X, A, $R_1$, $R_2$, $R_3$ and $n$ have the meanings assigned to them above, $R_4$ and $R_5$ are alkyl or aralkyl groups, $y$ is nought or a small positive integer, e. g. 1 or 2, $z$ is nought or 1, B is an acid residue and D is the residue of a heterocyclic nitrogen compound of the type used in cyanine dyes.

The residue A may be, for example, a benzene or naphthalene, anthracene or phenanthrene group which may or may not itself be substituted, e. g. by halogen atoms or alkyl, aryl, substituted aryl, aralkyl, substituted aralkyl, amino, substituted amino, alkoxy, aryloxy or carboxyl groups.

As stated above, the groups $R_1$, $R_2$ and $R_3$ may be hydrogen or hydrocarbon groups. Thus they may be alkyl, aralkyl or aryl groups, e. g. methyl, ethyl, propyl and higher alkyl groups, benzyl and naphthyl-methyl groups and phenyl, naphthyl and homologous aryl groups. The groups $R_4$ and $R_5$ are alkyl or aralkyl groups and may be, for example, any of the specific alkyl and aralkyl groups referred to above.

D in the foregoing Formula II is the residue of a heterocyclic nitrogen compound. Examples of suitable heterocyclic nitrogen compounds are: substituted or unsubstituted thiazoles, thiazolines, oxazoles, oxazolines, selenoazoles, selenoazolines, pyridine, quinoline, indolenine, diazines (e. g. pyrimidine) thiodiazoles and quinazoline and the corresponding substituted or unsubstituted polycyclic compounds such as benzthiazoles, naphthathiazoles and anthrathiazoles and the corresponding polycyclic oxazoles and selenazoles and also the diazines described in British Patent specification No. 425,609.

As already indicated, the process of this invention consists in a reaction between the quaternary salts. The salt groups may be the same or different and may be, for example, chloride, bromide, iodide, sulphate or perchlorate groups. Preferably, however, the reacting quaternary salts are alkyl or aralkyl-p-toluene sulphonates, e. g. ethyl or methyl-p-toluene sulphonate.

In carrying out the process of the invention, it is not necessary to isolate the quaternary salts of the two reactants. Thus, by condensing a compound of general Formula I with a heterocyclic nitrogen base containing the said reactive thioether, seleno-ether or aminovinyl group, together with sufficient alkyl or aralkyl salt to convert both reactants to quaternary salts, the reaction may be effected in one stage. A particularly convenient process is to employ an alkyl or aralkyl-p-toluene sulphonate and to effect the reaction by fusing together the compound of Formula I, the heterocyclic nitrogen base containing the specified reactive group and a sufficiency of alkyl or aralkyl-p-toluene sulphonate to convert both the reactants to quaternary salts.

Preferably, the condensation process of this invention is completed in the presence of an acid-binding agent, e. g. pyridine, piperidine, triethylamine, sodium acetate or sodium carbonate.

The following examples illustrate the invention but are not to be regarded as limiting it in any way:

Example I

2.2'-dimethyl-7.9-dimethylenethiaoxacarbocyanine iodide 0.92 gm. of 1'-($\Delta^1$)-cyclopentenyl benzoxazole, 0.95 gm. of 1-methylthiol benzthiazole and 1.95 gms. of methyl-p-toluene sulphonate were mixed together and fused for 3½ hours at 140° C. The mixture was then allowed to cool, 15 ccs. of pyridine were added and the mixture then warmed to dissolve the solid and then heated at a gentle boil for half-an-hour. The resulting solution was poured into a warm solution of 6 gms. of potassium iodide. A precipitate formed and this was separated by filtration, washed successively with ethyl alcohol, water, benzene and ether and then recrystallised from methyl alcohol. The product was thus obtained as minute green crystals, melting at 262° C. with decomposition. This dyestuff when included in a silver iodo bromide emulsion imparts a band of sensitivity extending to 6900 Å. with a maximum at 6700 Å. When included in a silver chloride emulsion it imparts a band of sensitivity between 5400 Å. and 6300 Å. with a maximum at about 6000 Å.

Example II

2.2'-dimethyl-7.9-dimethylene-5'.6'-benzoxacarbocyanine iodide

This dyestuff was prepared by a method similar to that described in Example I using 0.92 gm. of 1-($\Delta^1$)-cyclopentenyl benzoxazole, 1.1 gms. of 2-methylthiol-5.6-naphthoxazole, 1.95 gms. of methyl-p-toluene sulphonate, 15 gms. of pyridine and a solution of 6 gms. of potassium iodide. The product was obtained as a slate-coloured mass of minute crystals, melting at 242° C. with decomposition. This dyestuff when included in a silver iodobromide emulsion imparts a band of sensitivity extending to 6500 Å. with a maximum at 5850 Å.

Example III

2.2'-dimethyl-7.9-dimethyleneoxacarbocyanine iodide

This dyestuff was prepared by a method similar to that described in Example I using 0.61 gm. of 1-($\Delta^1$)-cyclopentenyl benzoxazole, 0.73 gm. of 1-methylthiol benzoxazole, 1.44 gms. of methyl-p-toluene sulphonate and 10 ccs. of pyridine. The product was obtained as fine purple crystals, melting at 282–284° C. with decomposition. This dyestuff when included in a silver iodobromide emulsion imparts a band of sensitivity extending to 5800 Å.

Example IV

2.3'-dimethyl-7.9-dimethylene-5'-methylthiol-ββ'-thiodiazole-oxacarbocyanine iodide A dystuff was prepared by a method similar to that described in Example I using 0.61 gm. of 1-($\Delta^1$)-cyclo-pentenyl benzoxazole, 0.79 gm. of dimethylthiol-ββ'-thiadiazole, 1.44 gms. of methyl-p-toluene sulphonate and 10 ccs. of pyridine. The product was obtained as dark green crystals, melting at 249–250° C. This dyestuff when included in a silver chloride emulsion imparts a band of sensitivity extending from 5100 Å. to 6400 Å. with a maximum at 6000 Å.

Example V

2.2'-dimethyl-7.9-trimethylene-oxathiacarbocyanine iodide 1 gm. of 1-($\Delta^1$)-cyclohexenyl benzoxazole, 1.81 gms. of 2-methylthiolbenzthiazole, and 2.73 gms. of methyl-p-toluene sulphonate were fused at 160–180° C. for 3½ hours. The mixture was then cooled, 12 ccs. of pyridine were added, and the mixture refluxed for half-an-hour. The resulting solution was then poured into a warm aqueous solution of potassium iodide. A little benzene was stirred into the mixture, which, on cooling, deposited the dyestuff in crystalline form. The crude product thus obtained was washed with hot benzene and recrystallised from methyl alcohol. The product was thus obtained as small dark blue crystals melting at 256° C. with decomposition.

The dyestuff when included in a silver iodobromide emulsion imparts a band of sensitivity extending to 6600 Å. with a maximum at 6200 Å.

Example VI

2-methyl-2'-ethyl-7.9-trimethylene-oxathiacarbocyanine iodide

This dyestuff was prepared by a method similar to that described in Example V using 1 gm. of 1-($\Delta^1$)-cyclohexenyl benzoxazole, 1.4 gms. of N-ethyl-benzthiazole-thione, 2.5 gms. of methyl-p-toluene sulphonate and 12 ccs. of pyridine. The product was thus obtained as small dark green crystals melting at 225° C. with decomposition.

This dyestuff when included in a silver iodobromide emulsion imparts a band of sensitivity extending to 6800 Å. with a broad maximum at 6300 Å.

Example VII

2.2'-dimethyl-7.9-trimethylene-thiacarbocyanine bromide

This dyestuff was prepared by a method similar to that described in Example V using 1.07 gms. of 1-($\Delta^1$)-cyclohexenyl-benzthiazole, 1.2 gms. of 2-methylthiol benz-thiazole, 2.5 gms. methyl-p-toluene sulphonate and 12 ccs. of pyridine and using a potassium bromide solution instead of a potassium iodide solution. The product was thus obtained as small dark green crystals, melting at 234° C. with decomposition.

This dyestuff when included in a silver iodobromide emulsion imparts a band of sensitivity extending to 7000 Å. with a broad maximum at 6600 Å.

Example VIII

2-methyl-2'-ethyl-7.9-trimethylene-thiacarbocyanine iodide

This dyestuff was prepared by a method similar to that employed in Example V using 1.07 gms. of 1-($\Delta^1$)-cyclohexenyl-benzthiazole, 1.4 gms. of N-ethyl-benzthiazole thione, 2.5 gms. of methyl-p-toluene sulphonate and 12 ccs. of pyridine. The product was obtained as small dark green crystals, melting at 275° C. with decomposition.

This dyestuff when included in a silver iodobromide emulsion imparts a band of sensitivity by extending to 6900 Å. with a maximum at 6700 Å.

Example IX

*2.1′ - dimethyl - 7.9 - trimethylene - thioquina-(1.2′)-carbo-cyanine iodide*

This dyestuff was prepared by a method similar to that employed in Example V using 1.07 gms. of 1-($\Delta^1$)-cyclohexenyl benzthiazole, 0.95 gm. of 2-methylthiol quinoline, 2.0 gms. of methyl-p-toluene sulphonate and 12 ccs. of pyridine. The product was obtained as small dark green crystals, melting at 270° C. with decomposition.

Example X

*2.1′-dimethyl-7.9-trimethylene thia-indo-(1.2′)-di-carbocyanine iodide*

1.07 gms. of 1-($\Delta^1$)-cyclohexenyl benzthiazole and 0.93 gm. of methyl-p-toluene sulphonate were fused together at 150–160° C. for 3½ hours. The salt thus obtained was dissolved in 15 ccs. of pyridine, 2.23 gms. of 2-ω-acetanilidovinyl 1.33-trimethylindolenium iodide was added, and the mixture refluxed gently for twenty minutes. The resulting solution was poured into a warm solution of potassium iodide. On cooling an oil separated from which a solid dyestuff was obtained by treatment with ethyl alcohol. The dyestuff was recrystallised from methyl alcohol and thus obtained as green crystals with a golden reflex melting at 38° C. with decomposition.

This dyestuff when included in a silver iodo-bromide emulsion imparts a band of sensitivity from 6000 Å. to 7400 Å. with a maximum at 7000 Å.

Example XI

*2-methyl-2′-ethyl-7.9-trimethylene - thia-dicarbocyanine iodide*

0.8 gm. of 1-($\Delta^1$)-cyclohexenyl benzthiazole and 0.75 gm. of methyl-p-toluene sulphonate were fused together at 140–150° C. for 3½ hours. The quaternary salt thus obtained was dissolved in 25 ccs. of pyridine, 1.2 gms. of 1-ω-acetanilidovinyl-2-ethyl benzthiazole iodide was added and the mixture refluxed gently for 20 minutes. The resulting solution was poured into a warm solution of potassium iodide and on cooling the dyestuff crystallised out. It was separated by filtration, recrystallised from methyl alcohol and thus obtained as bluish-green crystals, melting at 243° C. with decomposition.

This dyestuff when included in a silver iodobromide emulsion imparts a band of sensitivity from 6000 Å. to 7800 Å. with a maximum at 7200 Å.

Example XII

*2.2′.4.5-tetramethyl-7.9-dimethylene-thiaoxacarbocyanine iodide*

1.06 gms. of 4.5-dimethyl 1′($\Delta^1$)-cyclopentenyl benzoxazole, 0.96 gm. of 1-methylthiol benzthiazole and 1.9 gms. of methyl-p-toluene sulphonate were fused together at 120–130° C. for 3½ hours. The mixture was cooled, 20 ccs. of pyridine were added and the mixture then boiled for 20 minutes. The resulting solution was poured into aqueous potassium iodide solution and allowed to cool. The desired dyestuff crystallised out and was separated by filtration and washed with water, ethyl alcohol and hot benzene. On recrystallisation from methyl alcohol solution, the dyestuff was obtained as minute bronze crystals, melting at 283–286° C. with decomposition.

This dyestuff when included in a silver iodo-bromide emulsion imparts a band of sensitivity extending to about 6700 Å. with a maximum at about 6500 Å.

Example XIII

*2.2′.4.5-tetramethyl-7.9-dimethylene-3′.4′-benzthiaoxacarbocyanine iodide*

1.06 gms. of 4.5-dimethyl 1($\Delta^1$)-cyclopentenyl benzoxazole, 1.16 gms. of 1-methylthiol-3.4-naphthathiazole and 2 gms. of methyl-p-toluene sulphonate were mixed together and heated for 5 hours at 160° C. The resulting mixture was slightly cooled, 20 ccs. of pyridine was added and the whole was then gently boiled for 30 minutes. It was then poured into aqueous potassium iodide solution and allowed to cool. After dilution with ether, the dyestuff separated as black crystals. These were removed by filtration and washed with water, ethyl alcohol, benzene and ether. This dyestuff when included in a silver iodo bromide emulsion imparts a band of sensitivity extending to about 7000 Å. with maximum at about 6200 Å.

Example XIV

*2.2′-dimethyl 7.9-dimethylene thiacarbocyanine bromide*

1 gm. of 1($\Delta^1$)-cyclopentenyl benzthiazole, 0.98 gm. of 1-methylthiol benzthiazole and 1.95 gms. of methyl-p-toluene sulphonate were mixed together and heated at 120–130° C. for 3½ hours. 10 ccs. of pyridine were then added and the mixture boiled for 20 minutes and then poured into aqueous potassium bromide solution and allowed to cool. The product crystallised out and was filtered off and washed with water, ethyl alcohol and benzene. On recrystallisation from methyl alcohol solution, the product was obtained as black crystals with a green reflex, melting at 258–9° C.

This dyestuff when included in a silver iodo-bromide emulsion imparts a band of sensitivity extending to about 7100 Å. with a maximum at about 7000 Å.

Example XV

*2.3′-dimethyl-7.9 - dimethylene - 5 - methylthiol-ββ′-thiodiazole thiacarbocyanine bromide*

1.0 gm. 1($\Delta^1$)-cyclopentenyl benzthiazole, 1.2 gms. of dimethylthiol-ββ′-thiodiazole and 1.95 gms. of methyl-p-toluene sulphonate were mixed together and heated for 3½ hours at 120–130° C. 10 ccs. of pyridine were then added and the mixture then gently boiled for fifteen minutes, or less. The resulting solution was poured into aqueous potassium bromide solution and allowed to cool whereupon the product separated as blackish green crystals which on recrystallisation from methyl alcohol solution were obtained as light green crystals.

This dyestuff when included in a silver iodo-bromide emulsion imparts a band of sensitivity extending to about 6700 Å. with a maximum at about 6250 Å.

Example XVI

*2.2′-dimethyl 4′.5′-dimethoxy 7.9-dimethylene thiacarbocyanine bromide*

1.0 gm. of 1($\Delta^1$)-cyclopentenyl benzthiazole, 1.2 gms. 2-methylthiol-4.5-dimethoxy benzthiazole and 1.95 gms. methyl-p-toluene sulphonate were mixed together and heated for 3½ hours at 120–130° C. 20 ccs. of pyridine was then added and the whole warmed to dissolve the solid matter and then gently boiled for 15 minutes. The solution was then poured into aqueous potassium bromide solution and the dyestuff separated as green crystals, melting at 259–260° C. with decomposition.

This dyestuff when included in a silver iodobromide emulsion imparts a band of sensitivity extending to about 7100 Å. with a maximum at about 6800 Å.

EXAMPLE XVII

2-methyl-1'-ethyl 7.9-trimethylene thiaquino (1.2') dicarbocyanine iodide 1.07 gms. of 1($\Delta^1$)-cyclohexenyl benzthiazole and 0.93 gm. of methyl-p-toluene sulphonate were fused together at 140° C. for 3 hours, and the quaternary salt thus obtained dissolved in 10 ccs. pyridine. 1.49 gms. ω-acetanilidovinyl quinoline ethiodide was added and the mixture gently refluxed for 20 mins. The solution was then poured into a warm aqueous solution of potassium iodide which, after cooling, was diluted with water. An oil formed which hardened overnight and was recrystallised from methyl alcohol solution, yielding the dyestuff as dark green crystals, melting at 228° C.

This dyestuff when included in a silver iodo bromide emulsion imparts a band of sensitivity extending to about 8200 Å. with a maximum at about 7500 Å.

EXAMPLE XVIII

2.2'-dimethyl-7.9-trimethylene-thia-selena-carbocyanine bromide 1.31 gms. of 1($\Delta^1$)-cyclohexenyl benzselenazole, 0.90 gm. methylthiol benzthiazole and 1.86 gms. methyl-p-toluene sulphonate were fused together at 160° C. for 3 hours and the product refluxed gently with 10 ccs. pyridine for 20 minutes. The solution was poured into a warm aqueous solution of potassium bromide and benzene stirred in. The dyestuff crystallised on cooling and was purified by recrystallising from methyl alcohol solution. It consisted of dark green crystals, melting at 250° C.

All the compounds of the foregoing examples have structural formulae conforming to general Formula II. The system of numbering adopted for the substituent positions in the compounds is as follows: The ring structures are numbered thus

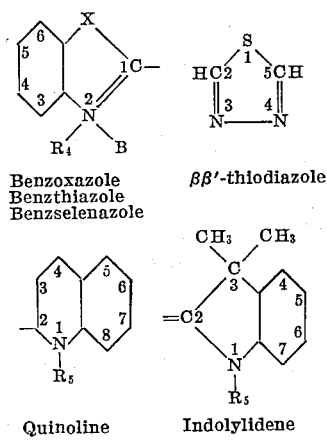

Benzoxazole
Benzthiazole
Benzselenazole

ββ'-thiodiazole

Quinoline

Indolylidene

The methine groups in the conjugated polymethine chain are numbered successively from the heterocyclic grouping to which, in the original intermediate, the cyclopentenyl or similar group is attached. Thus in the case of benzthiazole and similar intermediates where, as indicated above, the numbering goes up to 6, the next carbon atom in the conjugated chain is 7, the next 8 and so on. The positions of substitution in the heterocyclic grouping which is condensed with the cycloalkylene intermediate are differentiated as 1', 2', etc. Thus the compound of Example I has the formula:

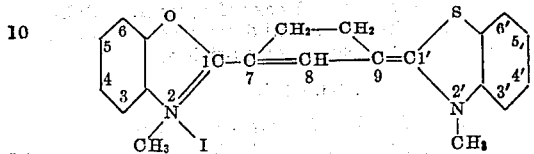

and the compounds of Examples II, III, V, VI, VII, VIII, XII, XIII, XIV, XVI and XVIII have analogous formulae with variations between benzthiazole, benzoxazole and the benzselenazole nuclei, between the nature of the substituents in the 2 and 2' positions, between the nature of substituents in the carbocyclic rings, and between the number of methylene groups linking the 7 and 9 positions.

The compound of Example IV has the formula:

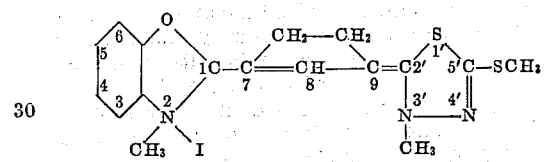

and the compound of Example XV has an analogous formula:

The compound of Example IX has the formula:

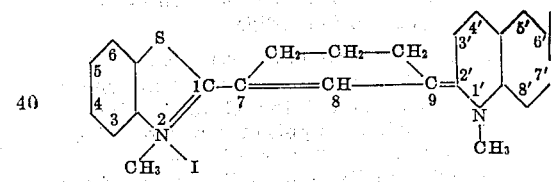

and a similar numbering of the quinoline ring obtains in the case of Example XVII.

The compound of Example X has the formula:

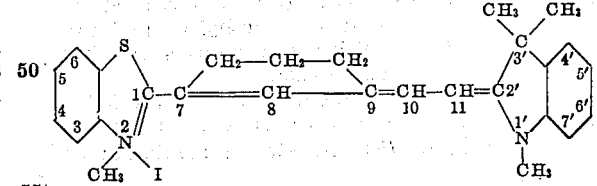

and the compounds of Examples XI and XVII have analogous formulae with different groups replacing the indolenine group.

As stated above, and as indicated in the foregoing examples, the dyestuffs of this invention are valuable sensitisers for silver halide photographic emulsions. They may be incorporated in silver halide emulsions of all types, e. g. silver chloride, silver bromide, silver chlorobromide and silver iodobromide emulsions. The quantity of dyestuffs employed for sensitizing will, of course, vary with the particular purpose for which the emulsion is intended. In general, for a typical emulsion containing the equivalent of 2% silver, calculated as metal, the proportion may range between 250 and 1250 ccs. of a 1 in 2000 solution per litre of emulsion.

In the following claims the expressions "thioether group," "selenoether group" and "aminovinyl type of group" have been used for the sake of briefness, but it is to be understood that the first two of these expressions include the corresponding aryl-, alkyl and aralkyl-thioether and -selenoether groups and that the third expression includes groups of the formula —(CH=CH)$_x$.NH$_2$ (where $x$ is 1, 2 or 3) and N-acyl, N-aryl and N-acylaryl substituted groups of this type.

What we claim is:

1. Process for the manufacture of dyestuffs which comprises condensing a compound selected from the class consisting of the alkyl and aralkyl quaternary salts of a compound of the general formula:

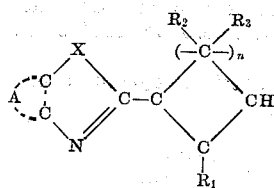

wherein A constitutes the atoms necessary to complete a benzene ring with the two carbon atoms attached to the cyclic atoms X and N, respectively, and form an aromatic hydrocarbon nucleus, X is an atom selected from the class consisting of the oxygen, sulphur and selenium atoms, R$_1$, R$_2$ and R$_3$ are selected from the class consisting of hydrogen atoms and hydrocarbon groups and $n$ is a small integer greater than 1) with a compound selected from the class consisting of the alkyl and aralkyl quaternary salts of heterocyclic nitrogen compounds of the type used in cyanine dyes containing in one of the α and γ positions to the heterocyclic nitrogen atom a reactive group selected from the class consisting of the reactive thioether, selenoether and amino vinyl types of group.

2. Process according to claim 1 wherein the condensation is effected in the presence of an acid binding agent.

3. Process for the manufacture of dyestuffs which comprises condensing a compound of the general formula:

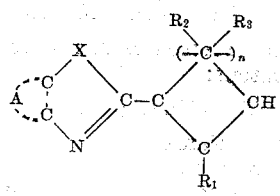

wherein A constitutes the atoms necessary to complete a benzene ring with the two carbon atoms attached to the cyclic atoms X and N, respectively, and form an aromatic hydrocarbon nucleus, X is an atom selected from the class consisting of the oxygen, sulphur and selenium atoms, R$_1$, R$_2$ and R$_3$ are selected from the class consisting of hydrogen atoms and hydrocarbon groups and $n$ is a small integer greater than 1) with a heterocyclic nitrogen compound of the type used in cyanine dyes containing in one of the α and γ positions to the heterocyclic nitrogen atom a reactive group selected from the class consisting of the reactive thioether, selenoether and amino-vinyl types of group, in the presence of a sufficiency of a salt selected from the class consisting of alkyl and aralkyl salts to convert both the said compounds to quaternary nitrogen salts.

4. Process according to claim 3 wherein the salt employed is an alkyl-p-toluene sulphonate.

5. Process according to claim 3 wherein the condensation is completed by heating the reaction mixture in the presence of an acid binding agent.

6. Process for the manufacture of dyestuffs which comprises condensing a compound selected from the class consisting of the alkyl and aralkyl quaternary salts of a compound of the general formula:

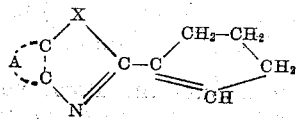

wherein A constitutes the atoms necessary to complete a benzene ring with the two carbon atoms attached to the cyclic atoms X and N, respectively, and form an aromatic hydrocarbon nucleus, and X is an atom selected from the class consisting of the oxygen, sulphur and selenium atoms) with a compound selected from the class consisting of the alkyl and aralkyl quaternary salts of heterocyclic nitrogen compounds of the type used in cyanine dyes containing in one of the α and γ positions to the heterocyclic nitrogen atom a reactive group selected from the class consisting of the reactive thioether, selenoether and amino-vinyl types of group.

7. Process for the manufacture of dyestuffs which comprises condensing a compound selected from the class consisting of the alkyl and aralkyl quaternary salts of a compound of the general formula:

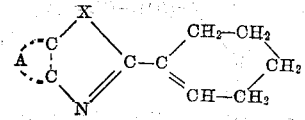

wherein A constitutes the atoms necessary to complete a benzene ring with the two carbon atoms attached to the cyclic atoms X and N, respectively, and form an aromatic hydrocarbon nucleus, and X is an atom selected from the class consisting of the oxygen, sulphur and selenium atoms) with a compound selected from the class consisting of the alkyl and aralkyl quaternary salts of the heterocyclic nitrogen compounds of the type used in cyanine dyes containing in one of the α and γ positions to the heterocyclic nitrogen atom a reactive group selected from the class consisting of the reactive thio-ether, selenoether and amino-vinyl types of group.

8. Process for the manufacture of dyestuffs which comprises condensing a compound of the general formula:

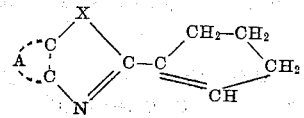

wherein A constitutes the atoms necessary to complete a benzene ring with the two carbon atoms attached to the cyclic atoms X and N, respectively, and form an aromatic hydrocarbon nucleus, and X is an atom selected from the class consisting of the oxygen, sulphur and selenium atoms) with a heterocyclic nitrogen compound of the type used in cyanine dyes containing in one of the α and γ positions to the heterocyclic nitrogen atoms a reactive group selected from the class consisting of the reactive thioether, selenoether and aminovinyl types of group, in the presence of a sufficiency of a salt selected from the class consisting of alkyl and aralkyl salts to convert both the said compounds to quaternary nitrogen salts.

9. Process for the manufacture of dyestuffs which comprises condensing a compound of the general formula:

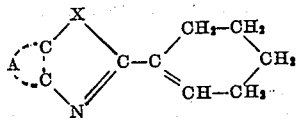

wherein A constitutes the atoms necessary to complete a benzene ring with the two carbon atoms attached to the cyclic atoms X and N, respectively, and form an aromatic hydrocarbon nucleus, and X is an atom selected from the class consisting of the oxygen, sulphur and selenium atoms) with a heterocyclic nitrogen compound of the type used in cyanine dyes containing in one of the α and γ positions to the heterocyclic nitrogen atom a reactive group selected from the class consisting of the reactive thioether, selenoether and amino-vinyl types of group, in the presence of a sufficiency of a salt selected from the class consisting of alkyl and aralkyl salts to convert both the said compounds to quaternary nitrogen salts.

10. Unsymmetrical dyestuffs of the general formula:

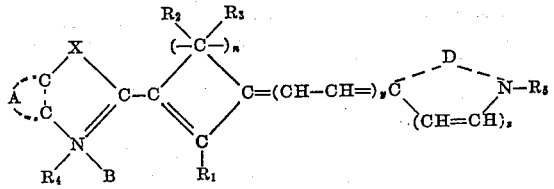

wherein A constitutes the atoms necessary to complete a benzene ring with the two carbon atoms attached to the cyclic atoms X and N, respectively, and form an aromatic hydrocarbon nucleus, and X is an atom selected from the class consisting of the oxygen, sulphur and selenium atoms, $R_1$, $R_2$ and $R_3$ are selected from the class consisting of hydrogen atoms and hydrocarbon groups and $n$ is a small integer greater than 1, $R_4$ and $R_5$ are groups selected from the class consisting of alkyl and aralkyl groups, $y$ is selected from the class consisting of nought and small positive integers, $z$ is selected from the class consisting of nought and one, B is an acid residue and D is the residue of a heterocyclic nitrogen compound of the type used in cyanine dyes, the heterocyclic ring of which D forms a part being different from that of which $x$ forms a part.

11. Unsymmetrical dyestuffs of the general formula:

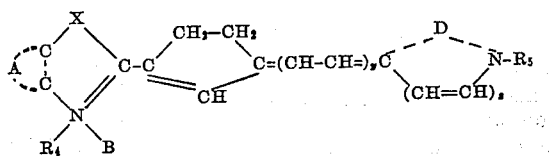

wherein A constitutes the atoms necessary to complete a benzene ring with the two carbon atoms attached to the cyclic atoms X and N, respectively, and form an aromatic hydrocarbon nucleus, and X is an atom selected from the class consisting of the oxygen, sulphur and selenium atoms, $R_4$ and $R_5$ are groups selected from the class consisting of alkyl and aralkyl groups, $y$ is selected from the class consisting of nought and small positive integers, $z$ is selected from the class consisting of nought and one, B is an acid residue and D is the residue of a heterocyclic nitrogen compound of the type used in cyanine dyes, the heterocyclic ring of which D forms a part being different from that of which $x$ forms a part.

12. Unsymmetrical dyestuffs of the general formula:

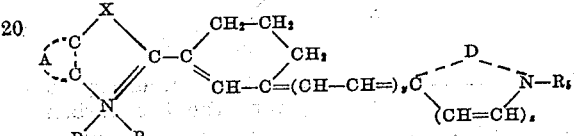

wherein A constitutes the atoms necessary to complete a benzene ring with the two carbon atoms attached to the cyclic atoms X and N, respectively, and form an aromatic hydrocarbon nucleus, and X is an atom selected from the class consisting of the oxygen, sulphur and selenium atoms, $R_4$ and $R_5$ are groups selected from the class consisting of alkyl and aralkyl groups, $y$ is selected from the class consisting of nought and small positive integers, $z$ is selected from the class consisting of nought and one, B is an acid residue and D is the residue of a heterocyclic nitrogen compound of the type used in cyanine dyes, the heterocyclic ring of which D forms a part being different from that of which $x$ forms a part.

JOHN DAVID KENDALL.
HAROLD GORDON SUGGATE.
HENRY WALTER WOOD.

REFERENCES CITED

The following references are of record in the file of this patent:

UNITED STATES PATENTS

| Number | Name | Date |
|---|---|---|
| 2,138,223 | Wilmans | Nov. 29, 1938 |
| 2,170,805 | Brooker | Aug. 29, 1939 |
| 2,323,503 | Wilson | July 6, 1943 |
| 2,263,749 | White | Nov. 25, 1931 |

OTHER REFERENCES

Proc. Roy. Soc. (London) 96 B, pp. 317–333 (1924).

Brit. Med. Jour. 1922, I., pp. 514–515.